United States Patent [19]
Nogi

[11] Patent Number: 5,408,677
[45] Date of Patent: Apr. 18, 1995

[54] VECTOR PARALLEL COMPUTER

[76] Inventor: Tatsuo Nogi, 55-4, Katsura Asahicho, Nishikyo-ku, Kyoto, Japan

[21] Appl. No.: 141,786

[22] Filed: Oct. 22, 1993

[30] Foreign Application Priority Data

Nov. 18, 1992 [JP] Japan .................. 4-333656

[51] Int. Cl.[6] .......................................... G06F 15/347
[52] U.S. Cl. ..................... 395/800; 364/DIG. 1;
364/229; 364/230; 364/230.3; 364/231.9;
364/232.21; 364/232; 364/243.7
[58] Field of Search ............ 364/200, 229, 230, 230.3,
364/231.9, 232, 232.21, 243.7; 395/800

[56] References Cited

U.S. PATENT DOCUMENTS

4,633,389 12/1986 Tanaka et al. ..................... 364/200
4,983,958 1/1991 Carrick ............................... 340/799

*Primary Examiner*—Alyssa H. Bowler
*Assistant Examiner*—Valerie Darbe
*Attorney, Agent, or Firm*—Morgan & Finnegan

[57] ABSTRACT

A back-end vector parallel computer system suitable for supercomputing in engineering and science, comprising N vector processor units and a cubic array of $N^3$ memory banks which are shared by N boards and are accessed through row and column common busses wired on all boards in the lattice form from vector processors through anyone of four routing ways in both 2- and 3-dimensional problems, and practicing computation of data accessed through any routing way in parallel for vectors on any section of data array with the selected direction, each vector data being processed by each corresponding vector processor, such parallel computations being usually repeated to the direction successively, and further changing alternatingly the direction of access if necessary for computation to be continued.

2 Claims, 12 Drawing Sheets

PROCESSOR PART    VECTOR-LATCH PART

ARCHITECTURE

ROW VECTORS

VERTICAL VECTORS

COLUMN VECTORS

DEPTH VECTORS

PROCESSOR PART    VECTOR-LATCH PART

ARCHITECTURE

MAIN MEMORY PART

ARCHITECTURE

PROCESSING TO Z-DIRECTION

MAIN MEMORY PART

PROCESSING TO Z-DIRECTION

PROCESSING TO Y-DIRECTION

MAIN MEMORY PART

PROCESSING TO Y-DIRECTION

PROCESSING TO X-DIRECTION

MAIN MEMORY PART

PROCESSING TO X-DIRECTION

AUXILIARY PROCESSING
TO X-DIRECTION

MAIN MEMORY PART

AUXILIARY PROCESSING TO X-DIRECTION

VECTOR PARALLEL COMPUTER

TECHNICAL FIELD

The invention relates to a parallel computer for supercomputing in engineering and science. The invention is applicable to make a computation in a wide range of a high degree-simulation or a CAD (computer aided design) including continuous systems and discrete or particle systems, and more specifically applicable to some fields, such as, a structural analysis, nuclear fusion-plasma engineering, a design of molecular materials, and semiconductor device engineering.

BACKGROUND OF THE INVENTION

Large scientific simulations usually demand both much memory and high speed. To supply that, some supercomputers of the vector type and parallel computers of the multiprocessor type have been developed in last two decades. Since the vector computer itself almost reaches the acme of development, it is expected that some systems with a number of vector processors or a lot of scalar processors or ones of the mixed type will form the next generation of supercomputers. Today we already have systems with several vector processors and a vast shared storage of many memory banks, but they are only an extension of conventional vector machines and rely on the idea of dividing a simple long vector into several parts to be computed by many pipelines. On the other hand, current parallel computers of the multiprocessor type mostly use the distributed memory system, and they use anyone of three types of network to transfer data among processors: the grid, the hyper-cube and the hyper-cross network type. The first has been used from the early stage, but it is not so hopeful due to problems in data transfer ability. The second, the hyper-cube network, was well appreciated until quite recently in the U.S., and it supplies more data transferring ability than the first. But its whole system generally assumes an inhomogeneous scheme of transfer, which cannot help reducing its performance. The last, the hyper-cross-network, is very powerful in allowing uniform data transfer among processors and therefore giving us a simple scheme of data passing. It was proposed by the same applicant and we already have its realization as a practical powerful machine (ADENART provided by Matsushita Electric Industrial Ltd.). That system with distributed storage and network, however, produces more or less overhead of data transfer, which diminishes its performance.

The new system replaced the buffer memories placed at all cross point nodes of the hyper-cross-network as seen in the previous system with the memory banks on those nodes, which constitute the main storage and allow three ways and an auxiliary way to access them. Those ways assure the full ability of the previous system with no overhead due to data transfer and hence allow to get a very high sustained performance.

Today's supercomputers with several vector units are supplied with a common memory array of banks, usually being accessible from all vector units, but they could not have many more vector units because it would become hard to secure sufficient access ways to many banks without any bank conflict. On the other hand, the new system of this invention allowed vector units only to access partial banks in the regular scheme from the outset. The scheme is based upon the concept of ADEPS(Alternating Direction Execution of 'Parallel over Segments') common to the whole family of parallel computers devised by the same applicant.

SUMMARY OF THE INVENTION

Accordingly, it is an object of the present invention to provide a new system, which we call a vector-parallel computer, with many vector processors (or alternatively, processor arrays) and data memory banks shared among those processors in an organized but restricted way. This new machine is characterized not only in having a variety of access routes to the data storage but also in practicing some data edition in the storage itself as a whole system. Data edition was one of the most fundamental concepts in U.S. Pat. No. 4,514,807, and it stood for general data transmission. The concept continues to live in the new system of the present application, but the array of buffer memories on the hyper-cross-network is now replaced by the array of memory banks, which allows conceptual data edition by only changing access ways to the memory array without the need to practice real data transmission. Actually, the last model of ours, disclosed in Japanese Patent Application No. 278,765 of 1988 (Japanese Laid-Open Patent Publication No. 123,481 of 1990) has replaced buffer memories placed on all nodes of the 3-dimensional hypercross-network in the previous system with memory banks, to remove the middle stage of buffering for edition, and has replaced the plane array of processors with distributed local storages by an array of vector processors (or processor arrays), which are able to access the memory bank system in the same way in two different directions as the processor array of the previous system does to the hyper-cross-network cube. The last scheme is very useful for the necessary data edition, but it holds the same data array in such multiple ways as to waste extra memory. The system of the present invention is designed to have a scheme of three access ways (and one more way) to memory banks in order to solve the extra-memory problem. It practices necessary data edition without wasting extra storage. However, increasing access routes generally demand many additional bus lines, and hence it is essential to use as many bus lines in common as possible without increasing time for the data transferring. This invention offers a solution to this problem.

The computer system of this invention is a back-end system under a front-end host computer. The system according to a second aspect of the invention consists of three parts: 1) a processor part which contains a control processor unit CU and a number N of vector processor units, say VU1, VU2, ... VUN, 2) a main memory part of many banks which are arranged in a cubic grid (N×N×N) and are joined by the sets of row and column common busses that open access routes from vector processors, and 3) a vector-latch part of N vectors with length N (actually a two-dimensional array of element-latches) standing between the first two parts.

Control unit CU has a program memory and a decoder of object codes. It sends control signals to vector units, the vector-latch part and the main memory part. Each vector unit VU has a number of vector pipelines and registers for processing vector data taken from the main memory, as well as a scalar processor and a scalar data memory and an input/output data channel from/to the front-end processor.

The vector-latch part has as many vector-latches VL1, VL2, ..., VLN as VU's, each being connected with a corresponding VU. Each vector latch VL consists of N element-latches, and it has parallel ports connected to external common busses for sending/receiving data on respective element-latches to/from the main memory part. Here 'common' means that each parallel bus touches all element-latches forming a section of all vectorlatches, as a whole and it further has two serial ports connected to internal common busses, the first also being connected to the main memory part and the second to its corresponding vector register. Totally, those VL1, VL2, . . . and VLN are connected with the vector processing units through respective second serial ports on one side, and with the main memory part through first serial ports and parallel ports on the other side. The whole cubic array of memory banks are placed on N boards, with each board having a sliced subarray of N×N banks. Each bank has a temporary storage of N word length on its gateway, which we call a access-latch. A set of row busses of the number N and another set of column busses of the same number run on every board as a lattice, and access-latches are placed on all cross points(nodes) so that they may be accessed through row or column busses joining at their respective nodes.

It is essential to allow four ways to access the main memory, and their characteristics are seen mainly in connection schemes between the main memory 2nd the vector-latch part. They are explained later.

BRIEF DESCRIPTION OF THE DRAWINGS

The present invention is described with reference to the following drawings which forms a part of the specification and wherein.

The first four figures show four points of view to a three dimensional data array, on which is founded the scheme of data access and processing.

The remained figures are for description of the detailed architecture.

SCHEME OF VECTOR-PARALLEL PROCESSING

Figure 1:
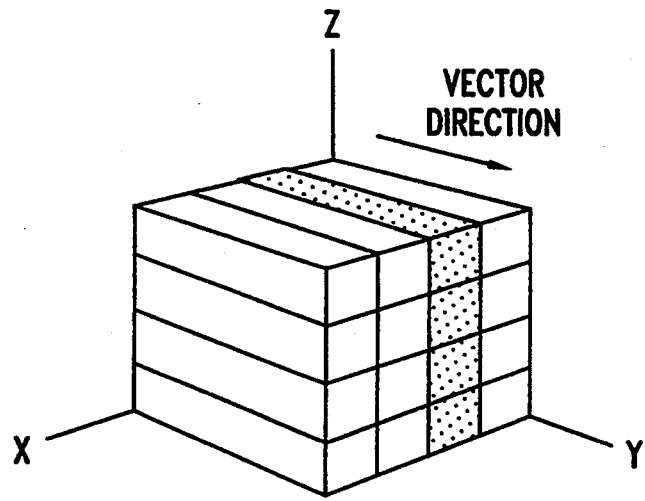
FIG. 1 shows the first point of view that the three-dimensional data array consists of row vectors, each row vector being identified with any specified x- and z-index, and such row vectors as shaded with any specified same x-index may be accessed and processed in parallel at the same time, each row vector by each vector processor corresponding to the z-index of the row vector. This scheme is called the processing in the x-direction. The last direction corresponds to that of serial sweep along the x-axis.
Figure 2:
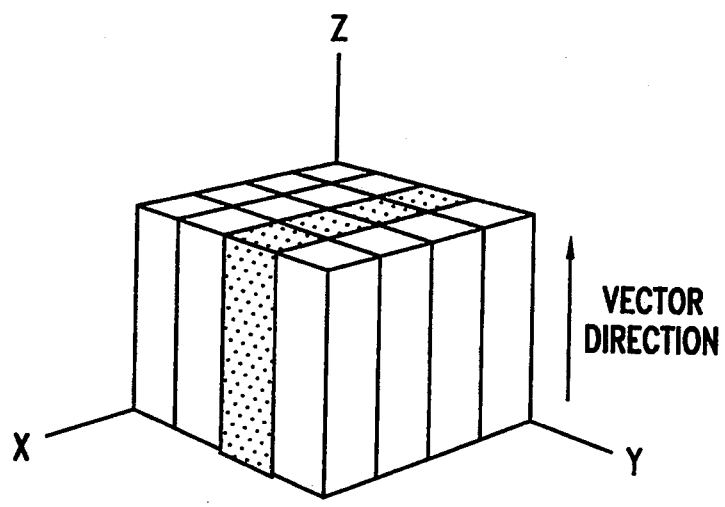
FIG. 2 shows the second point of view that the same three-dimensional data array consists of vertical vectors, each vertical vector being identified with any specified x- and y-index, and such vertical vectors as shaded with any specified same y-index may be accessed and processed in parallel at the same time, each vertical vector by each vector processor corresponding to the x-index of the vertical vector. This scheme is called the processing in the y-direction, corresponding to the sweep along the y-axis.
Figure 3:
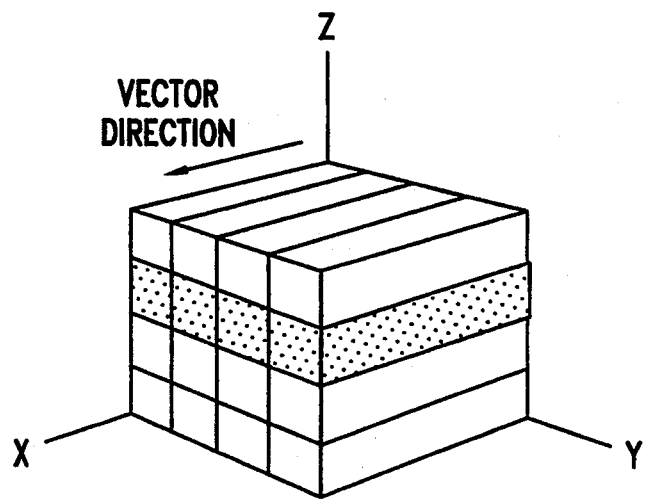
FIG. 3 shows the third point of view that the same three-dimensional data array consists of column arrays, each column vector being identified with any specified y- and z-index, and such column vectors as shaded with any specified same z-index may be accessed and processed in parallel at the same time, each column vector by each vector processor corresponding to the y-index of the column vector. This scheme is called the processing in the z-direction, corresponding to the sweep along the z-axis.

It is first necessary for description of the architecture to clarify concepts of row, vertical and column vectors. It is supposed to compute some three-dimensional data produced originally in a coordinate system (x,y,z). We call a one dimensional subarray with any specified z- and x-index a row vector, one with any specified x- and y-index a vertical vector and one with any specified y- and z-index a column vector. We then have three points of view for the same three-dimensional array, that is, the first is to see the whole array as a set of row vectors (FIG. 1), the second is as that of vertical vectors (FIG. 2) and the third is as that of column vectors (FIG. 3).

It is then possible to introduce first three routing ways to access those vectors.

1) The first way is to access row vectors with all elements at the respective tops of the access-latches (which, in turn, here and in the following two cases correspond to data having the same local-address in banks) with any specified row number over all boards through row busses which are opened to the corresponding column's bus on respective boards and serial ports of the vector-latches, so that all those row vectors may be sent/received to/from the vector-latches.

2) The second way is to consider a data set of elements having the same z-index, each taken from vertical vectors with the same column number, called a column section, and to access column sections having all elements at the respective tops of the access-latches with the specified column number over all boards through column busses which are opened to parallel ports of vector-latches, so that all column sections of the same column number may be sent/received to/from the vector-latches. It then has there all vertical vectors of the same column number. Consequently, all those vertical vectors can be sent/received to/from the vector-latches.

3) The third way is to access column vectors with all elements at the respective tops of access-latches on the selected board through column busses which are opened to serial ports of vector-latches, so that all column vectors on that board may be sent/received to/from the vector-latches.

An auxiliary point of view may be introduced in the case that any specified access-latch itself contains a vector data taken from its connected memory bank. So, 4) The final way is to access all the elements in access-latches (which correspond to data having a same regular sequence or local addresses in banks) with the specified row and column number passing through row busses which are opened as in the first way.

There are four kinds or parallel processing, corresponding to three points of view and an auxiliary point of view: say, processing in the x-, y-, z-direction and an auxiliary processing in the x-direction. Processing in the x-direction is to compute all row-vectors with a specified x-index in vector processing along the y-index and in parallel over the z-index, and to repeat it successively changing the x-index. Processing in the y-direction is to compute all vertical-vectors with a specified y-index in vector-processing along the z-index and in parallel over the x-index and to repeat it successively changing the y-index. Processing in the z-direction is to compute all column vectors with a specified z-index in vector processing along the x-index and in parallel over the y-index and to repeat it successively changing the z-index. Those processing ways use the respective access ways or 1), 2) and 3) above.

Figure 4:
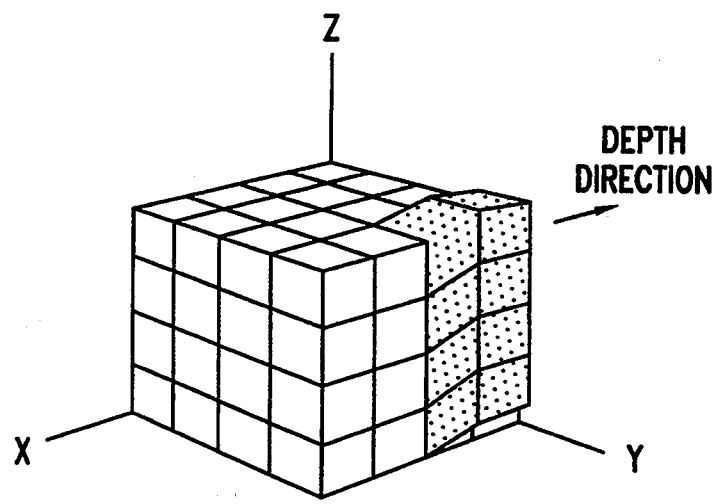
FIG. 4 shows an auxiliary point of view that each element of a three dimensional array itself is a vector with the 'depth' direction, each depth vector being identified with any specified x-, y-, and z-index, and such depth vectors as shaded with any specified same x- and y-index may be accessed and processed in parallel at the same time, each depth vector by each vector processor corresponding to the z-index of the depth vector. This scheme is called the auxiliary processing in the x-direction or the processing in the depth direction. The last point of view is necessary for processing 2-dimensional arrays, as explained later.

In addition, there is one more processing mode which is realized by using access way 4). It appears in processing two-dimensional arrays, as explained later. Those arrays are mapped into four-dimensional (three and 'depth') arrays which are actually realized on the three-dimensional architecture (FIG. 4). It stands for an auxiliary processing in the x-direction in the three-dimensional case, or it may be called the processing in the depth direction. It is to compute all vectors with a specified x- and y-index on all boards formed by ranging over the depth index, in vector-processing along the depth index and in parallel over the z-index, and to repeat it successively changing the x- and y-indexes.

DETAILED DESCRIPTION OF THE PREFERRED EMBODIMENT

This section gives details of the system architecture, especially how access ways mentioned in the last section are realized. For illustration, we often refer figures mentioned above, in which the number N of vector processors is taken to be 4 for simplicity. Interpretation may apply to more general cases with more processors, too.

Figure 5A:
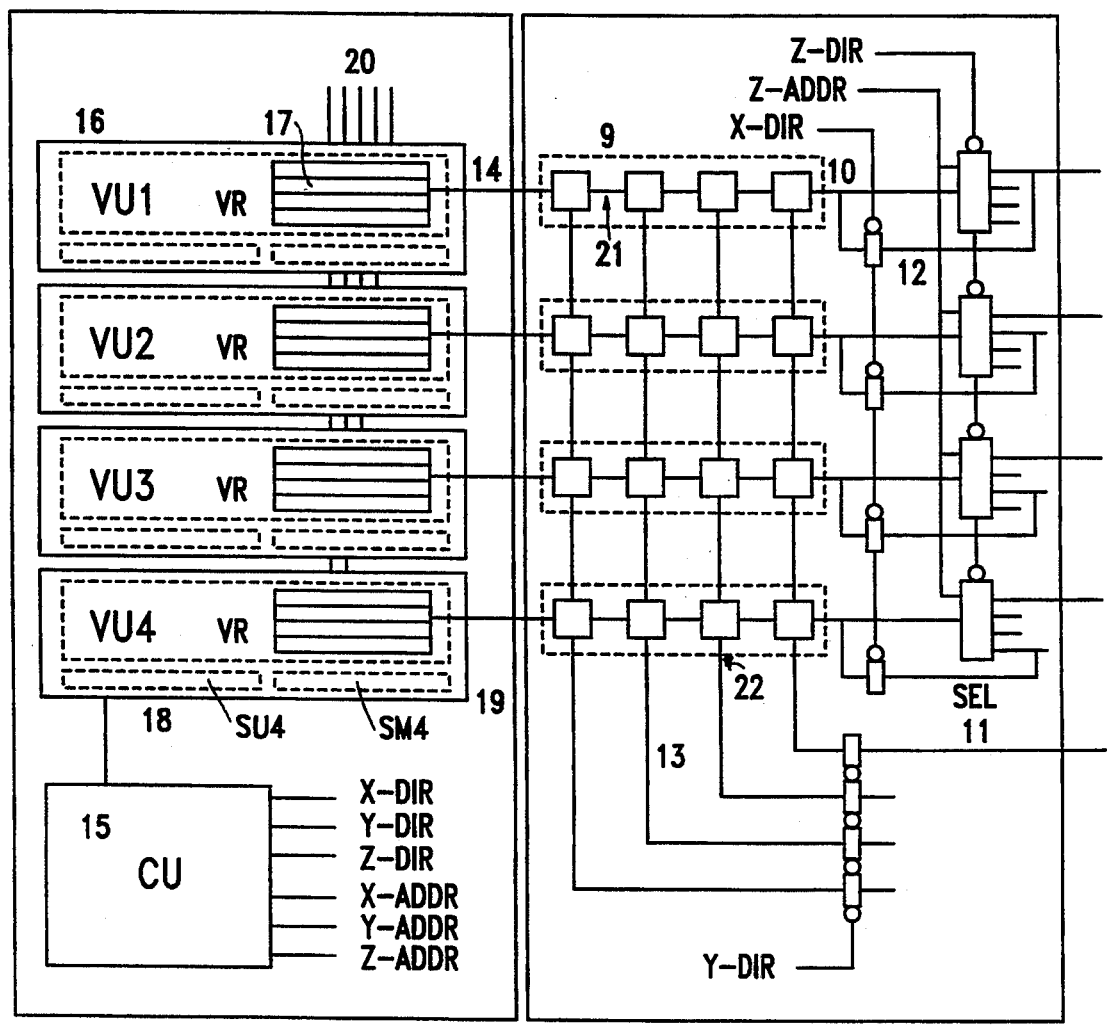
FIG. 5 is a functional block diagram of a preferred embodiment of the vector parallel computer employing a multivector-processor system in accordance with the invention and showing an outline of bus connection between the processor part and the main memory part via the vector-latch part. Those busses are used selectively according to those points of view as seen in FIGS. 1-4, respectively.
Figure 5B:
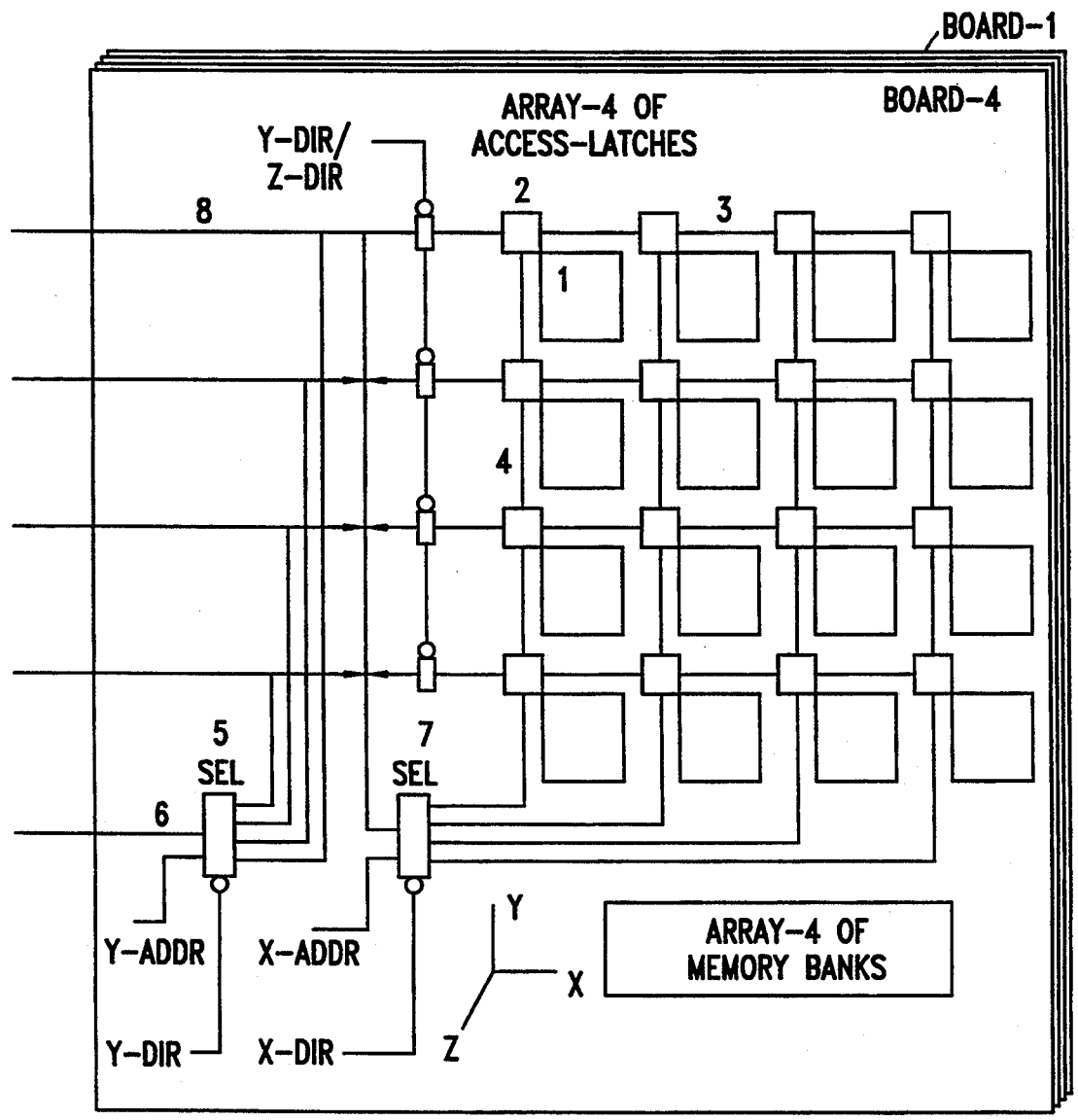
Figure 6A:
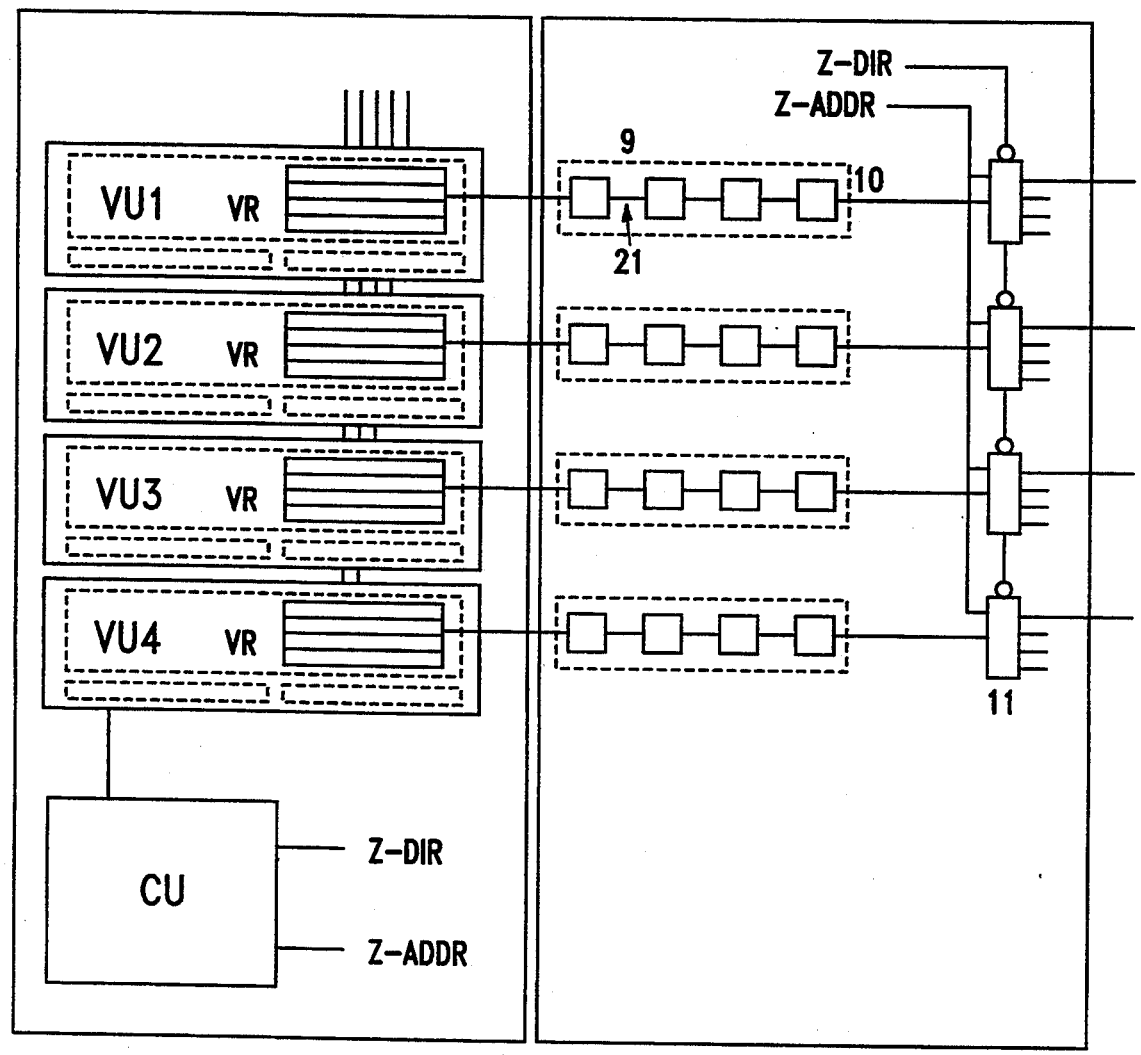
FIG. 6 shows the connection scheme for the processing in the z-direction for such column vectors as seen in FIG. 3.
Figure 6B:
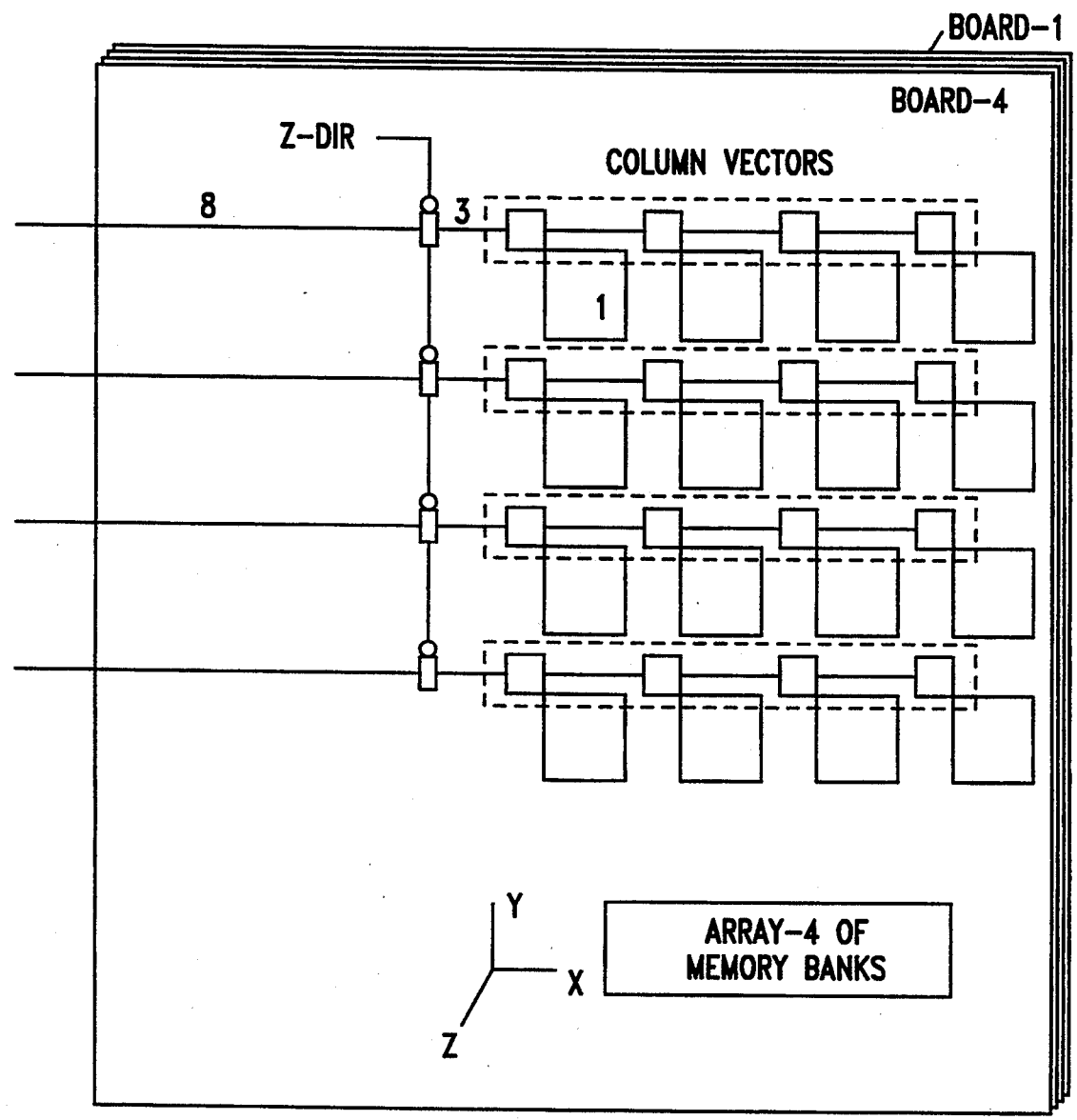
Figure 7A:
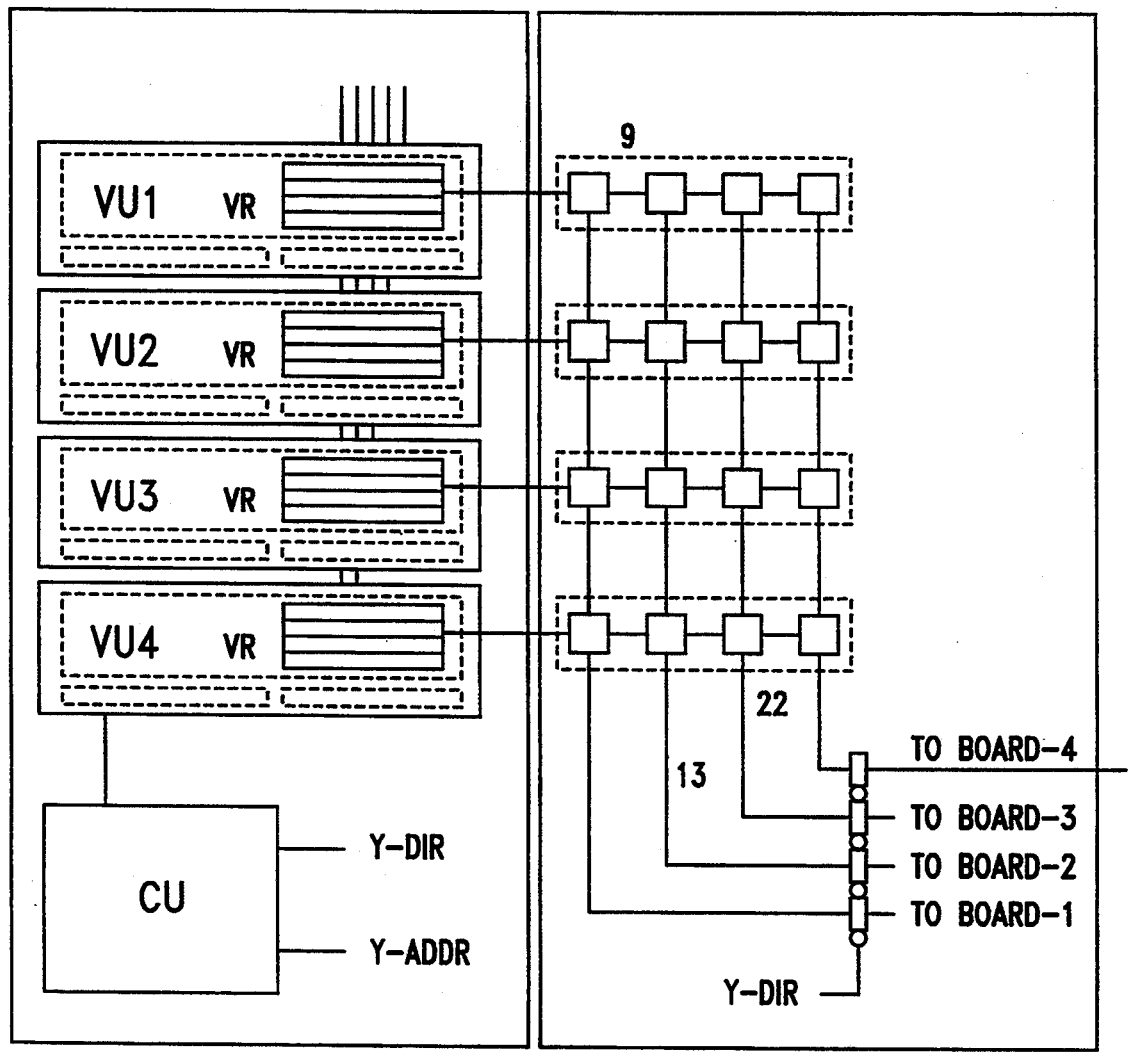
FIG. 7 shows that for the processing in the y-direction for such vertical vectors as seen in FIG. 2.
Figure 7B:
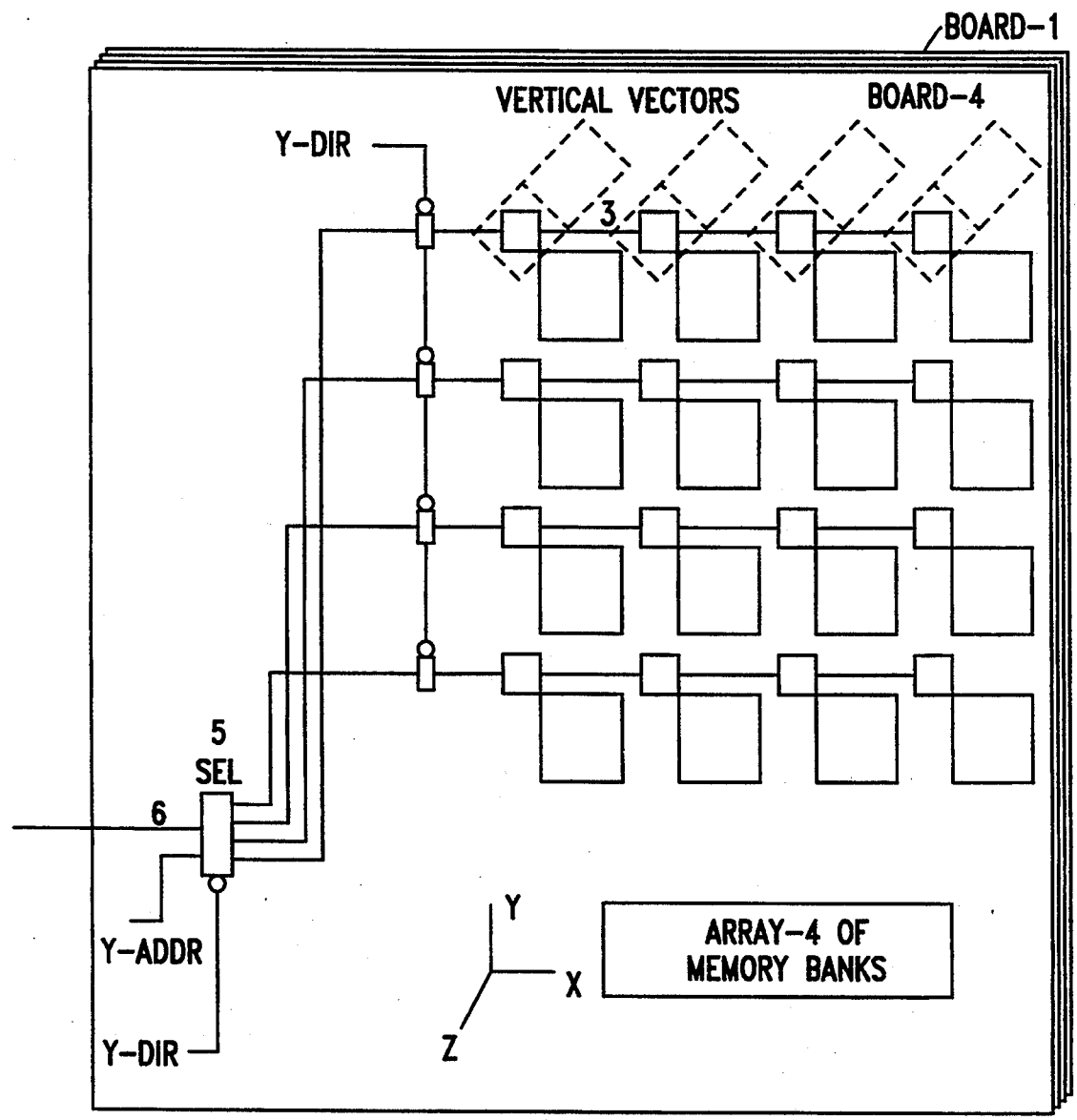
Figure 8A:
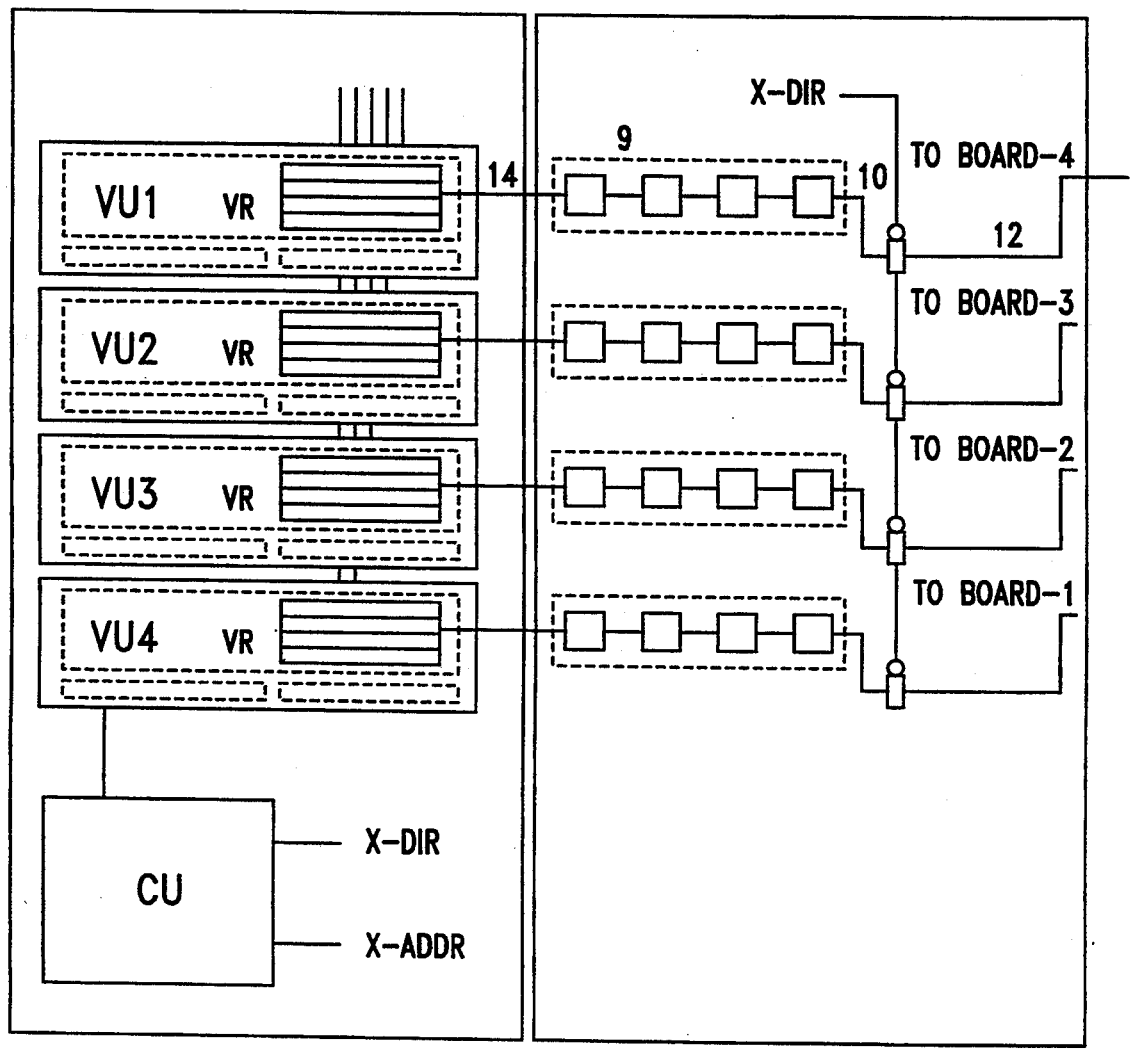
FIG. 8 shows that for the processing in the x-direction for such row vectors as seen in FIG. 1.
Figure 8B:
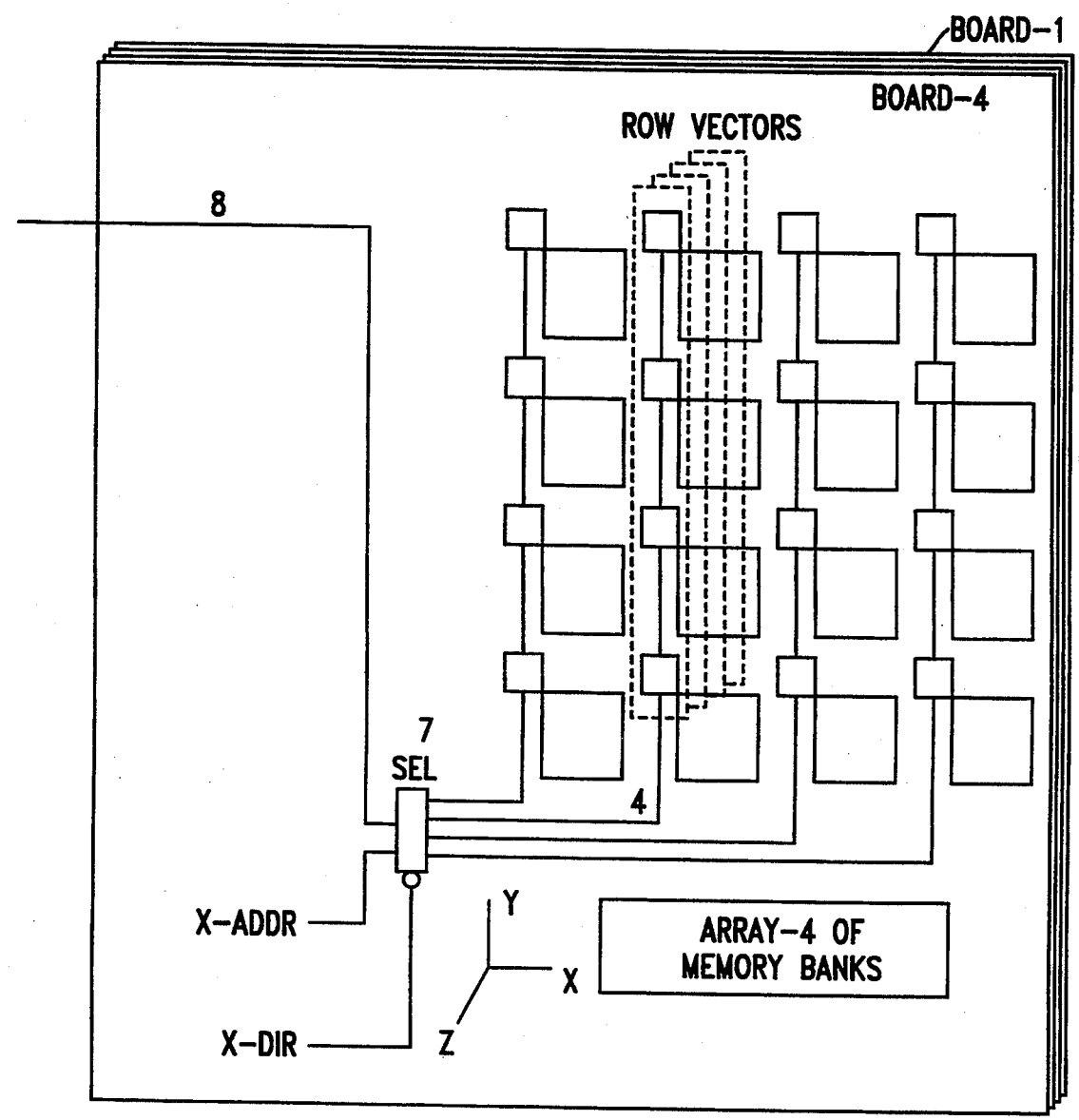

As shown in FIG. 5, the system consists of the processor part, the main memory part and the vector-latch part. In the main memory part, there are 4 boards in concert with N=4, each of which is assumed to be selected by specifying a z-index in a three-dimensional array, and has a two-dimensional subarray (N×N) of memory banks. Every bank (1) has a access-latch (2) of N word length which is placed on a corresponding cross point (node) of a grid network of column (3) and row (4) busses running in the x- and y-directions respectively. Those busses are common for all access-latches just on those busses. Column busses (3) on all boards are used in processing both in the z- and y-directions. In processing in the z-direction, they are directly joined to the serial ports (10) and the internal common busses (21) of the vector-latches through column busses of any board specified by the board selector (11) (see FIG. 6). In processing in the y-direction, column busses specified by the selector (5) using the y-index are connected to the y-edge-bus (6), and the respective sections of vector-latches through external common busses (13) and parallel ports (22) (see FIG. 7). In processing in the x-direction, row busses specified by the x-index, are connected through selector (7) to the common edge busses (8) specified by the z-indexes, and further to the respective vector-latches through the respective z-specifying-busses (12) and the serial ports (10) (see FIG. 8).

The vector-latch part stands between the main memory and the processor part and temporarily holds a set of vectors of N word length. It has vector-latches (9) whose number is N, each of which has N element-latches connected to internal common busses. Serial ports are placed on both ends of all vector-latches, and the first serial ports (10) faces the main memory and the second serial ports (14) faces the processor part. In processing in the z-direction, the first serial ports are connected to all common edge busses (8) through the board selector (11) and further to all column busses on the memory board selected by the z-index. In processing in the x-direction, those serial ports are connected to the respective z-specifying-busses (12), common edge busses (5) and further x-specifying-row busses (4) on all boards. In processing in the z- and x-directions, row- or column-vectors in the main memory themselves are transferred to/from the vector-latches through serial ports, while in processing in the y-direction, section data whose elements are those of the same z-index from the necessary vertical vectors with a specified y-index are transferred to/from the vector-latches through parallel ports and external common busses (13) which are common to all vector-latches, each external common bus being connected to all element-latches of thee same order number in the vector-latches. Those parallel ports are connected to y-edge-busses (6) and column busses (3) of memory boards. Here is just the reason to supply the vector latch part, which plays a role of data edition automatically. In processing in every direction, the second serial ports (14) are directly connected to vector units.

The processor part has a control unit CU (15) and vector units (16) of the number No Those vector units have the same configuration, a number of vector registers and another number of processing pipelines (17). Those word lengths are several times N so as to increase the performance of the vector processing. Every vector unit further has a scalar processing unit (18) and a scalar data storage (19). Those vector units have data channels (20) for high speed input/output of a vast number of data. The control unit gives a sequence of processing commands to all vector units, a sequence of access signals and addresses to the main memory part, and other control signals to the whole system. It also contains an instruction storage.

STANDARD SCHEME OF COMPUTATION BY USING THE NEW SYSTEM

Figure 9A:
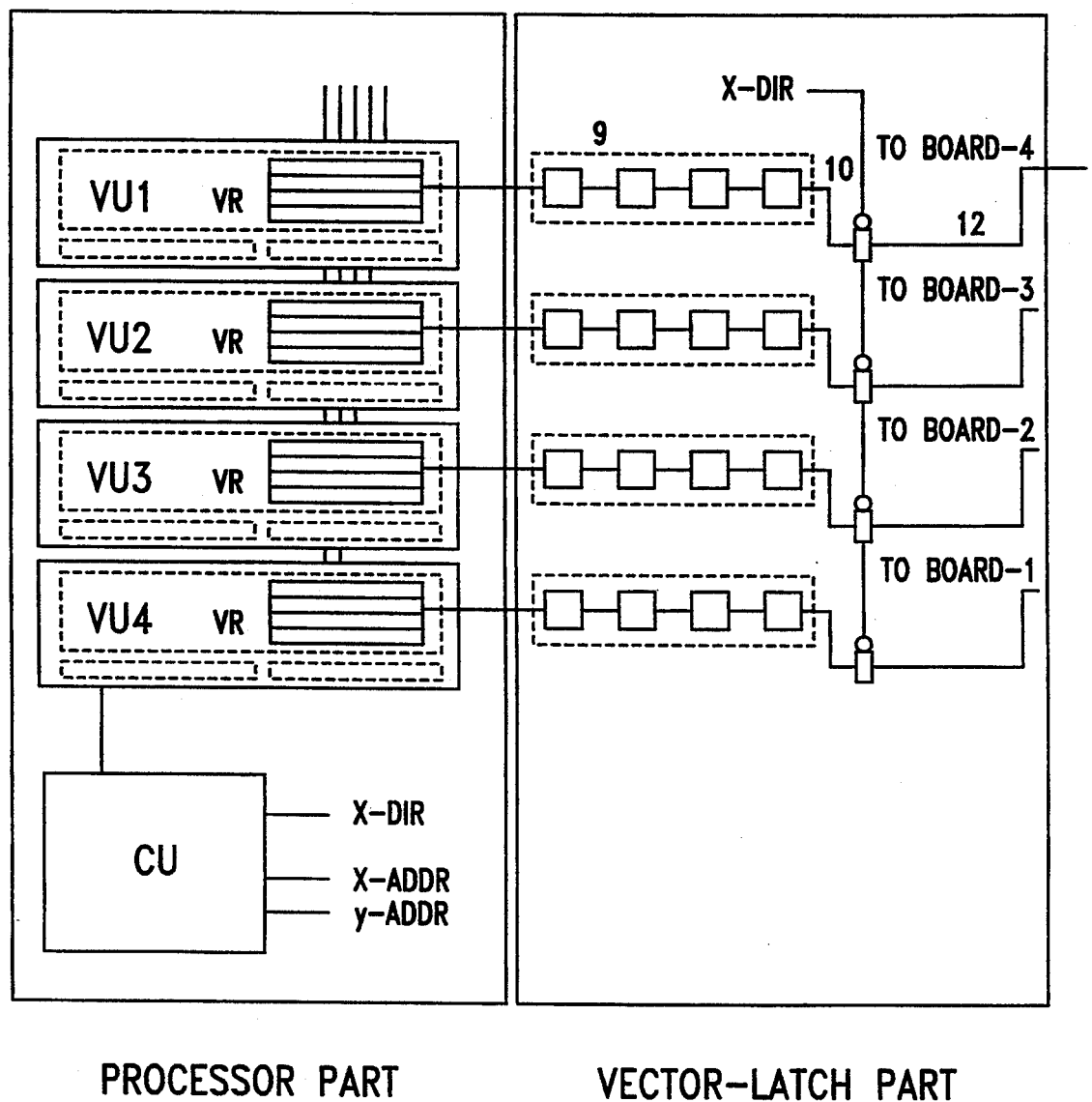
FIG. 9 shows that for the auxiliary processing in the z-direction for such depth vectors as seen in FIG. 4.
Figure 9B:
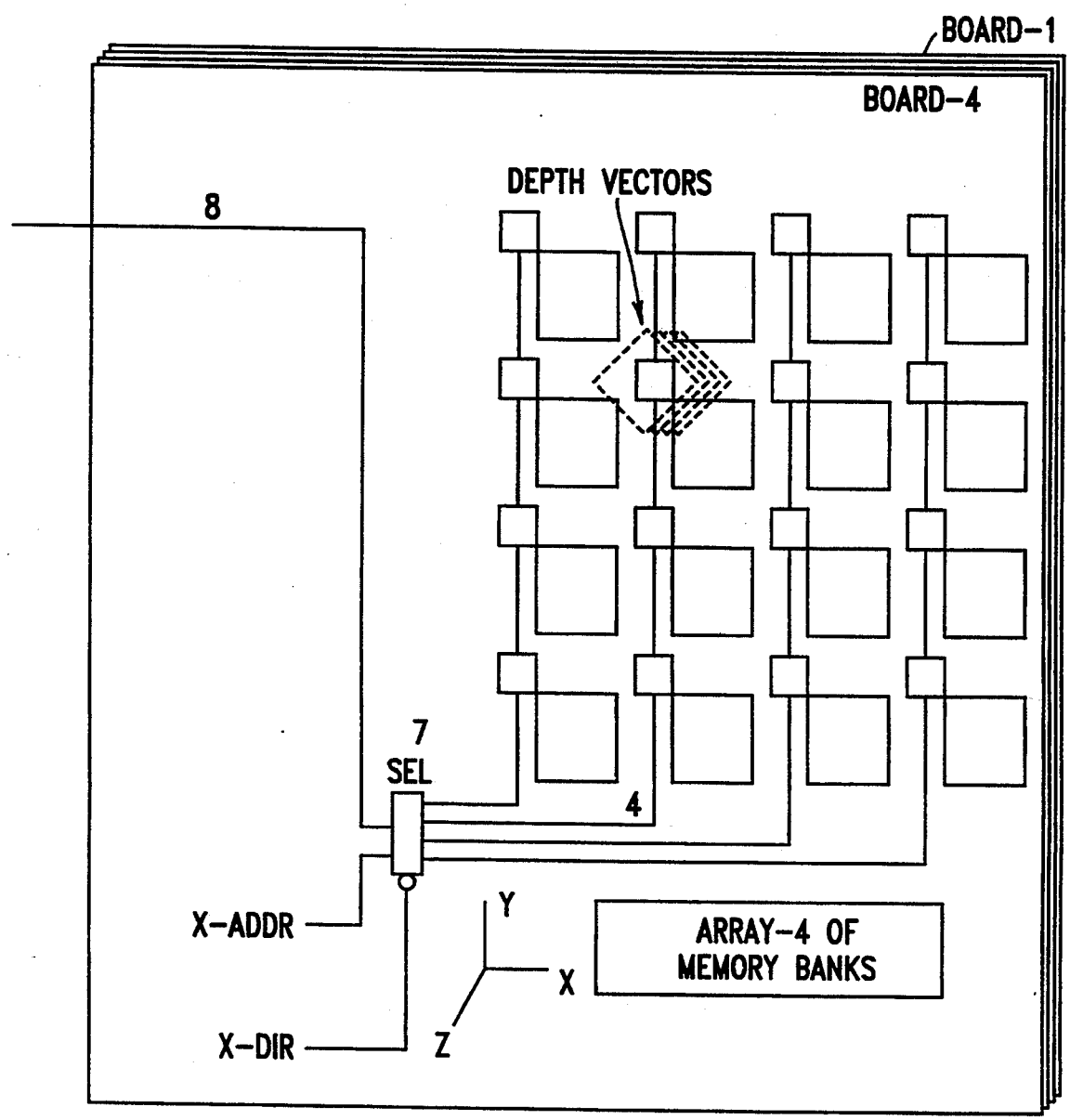

This section explains a standard scheme of computation. Suppose to practice the processing in the x-direction. When CU decodes a 'reading' code, it sends the x-direction signal, x-address and local address within banks. Then all data appear in the row of the top elements of the access-latches specified by the x-address, one row to one z-address. They are carried through the row busses, common edge busses and vector-latches to the vector registers. On changing local address, another set of row vectors from the same row of banks may be carried through the same route as above to be appended to the vector registers. Continuing this process may lead to get as long vectors as possible, which are transferred into pipelines for processing. It is important for such repetition to send data continuously through access-latches, vector-latches and vector registers. In order to do that, as soon as a part of a vector is sent to a next stage, its next part should appear. Especially, for the multiple use of banks to provide a virtual processor environment, several elements must be placed in the respective access-latches successively to read/write from/in banks, and the hardware should then give support for successive accesses. Processing in the y or z-directions takes similar actions. Only a case of auxiliary processing in the x-direction is different from other cases in that vectors themselves are latched in access-latches in the depth-direction (see FIG. 9).

Processing in the x-direction easily computes the whole set of two row vector operands with different x-indexes or depth addresses in banks over a given range of y- and z-indexes, with an vector mode for the y-index and an parallel mode for the z-index. Similarly, processing in the y-(or z-) direction computes that of two vertical (row) vector operands with different y-(z-)indexes or depth addresses over a given range of z-(x-) and x-(y-)indexes, with an vector mode for the z-(x-)index and an parallel mode for x-(y-)index. Further, auxiliary processing in the x-direction for 4-dimensional array data computes that of two depth vector operands being different in the x- or y-index or in position within banks over a given range of the z-index, with an vector mode for the depth address and an parallel mode for the z-index.

The new system is designed especially for 3- or 2-dimensional simulations, and matrix computations in scientific and engineering problems. It fits very well the processing of 3-dimensional array data. Such processing is taken as a fundamental one, it can be further applied for 2-dimensional and matrix problems.

The first to be explained is just the fundamental 3-dimensional scheme. Its characteristic is easily seen in the way how to put a 3-dimensional data, say {u(i,j,k), i=1, 2, ..., pN, j=1, 2, ..., qN, k=1, 2, ..., rN), into the main banks of memory: in putting i=(P−1)N+I, j=(Q−1)N+J and k=(R−1)N+K, each element u(i,j,k) is placed at the {(R−1)pq+(Q−1)p+P}$^{th}$ position after that of the first element u(I,J,K) in the (I,J,K)$^{th}$ bank. This means that (I,J,K) selects one of the banks and (P,Q,R) determines a position in the selected bank. Every bank is occupied by the number pqr of elements. It may suggest the ability to access $N^3$ elements with the same (P,Q,R), at one time. That bandwidth is, however, too huge to implement in reality, and the new system has only a bandwidth of one-order-less so as to access $N^2$ elements at one time, which are specified by fixing one of I,J, and K and running the remaining indexes.

The next characteristic is to allows any one of three access ways as desired. Such ways are distinguished by the expression of elements using indexes enclosed by slashes as seen in the following examples:

(1) u(i,/j,k/)
(2) u(i/,j,/k)
(3) u(/i,j/,k)

The first is to access any 2-dimensional subarray (section) with a specified index i, ranging over the region of j and k, j=1, 2, ..., qN, k=1, 2, ..., rN. It is needless to say that those accesses of $N^2$ elements must be repeated qr times for Q=1, 2, ..., q and R=1, 2, ..., r to complete full access. This way is just for processing in the x-direction.-The second is to access any section with a specified index j, ranging over k=1, 2, ..., rN and i=1, 2, ..., pN. This corresponds to processing in the y-direction. Finally, the third is to access any section with a specified index k, ranging over i and j. It must be noted that those expressions denote only different access ways, but mean the same data. If it would be necessary to distinguish between vector and parallel processing, the array could be expressed as (1) u(i,/j,/k//)
(2) u(/i//,j,/k)
(3) u(/i,/j//,k).

The first expression (1) means that necessary processing is serial in i and parallel in j and k, with vector processing for j which is enclosed singly by slashes and with purely parallel processing for k which is enclosed doubly by slashes. Similarly, the second (2) (third (3)) means that it is serial in j(k), vector in k(i) and purely parallel in i(j). It is, however, assumed that both vector and purely parallel processing are categorized only in parallel processing and users need not know such distinctions in a well devised programming environment.

For example, consider a simple FORTRAN program:

```
do 10 k=1,16
  do 10 j=1,16
    do 10 i=2,15
      v(i,j,k) = u (i+1,j,k) + u(i−1,j,k)
```

It may be written as

```
pdo j=1,16,k=1,16
  do 10 i=2,15
    v(i,/j,k/) = u(i+1,/j,k/) + u(i−1,/j,k/)
pend
```

Here, only single slashes are used because there is no necessity of expressing distinctions between vector and parallel processing and for simplicity.

As seen in the above example, users may use only such indexes in slashes in a pdo-pend clause as listed just in the pdo statement, and may not use their general expressions or other variables in slashes. The reason is as follows: index k, which would be enclosed doubly in slashes, is just for purely parallel processing, and corresponds to the order number of vector units. It leads to the necessity of data transfer among vector units to allow something like expressions, but may conflict with the simplicity of the pdo-pend clause for parallel processing. On the other hand, about index j which would be enclosed singly by slashes, such simple expressions of j+1 or j−1 might be allowed because they would require only the shift operations in vector registers, but to prohibit more general expressions it is better to suppose no allowance also for j as for k. These restrictions produce no problems since changing the direction of processing allows general expression in a corresponding bare index part.

It remains to explain the processing way for the 2-dimensional problems. It is also important to solve those problems effectively, since 2-dimensional simulations themselves appear in many applications and matrix problems come from many branches as their final step to solution. The essential point is how a 2-dimensional array, say $\{u(i,j), i=1, 2, \ldots, N^2, j=1, 2, \ldots N^2\}$, should be mapped into the memory banks of a 3-dimensional grid configuration. We must here have two ways of processing, which are expressed in the data array as (1) u(i,/j/)
(2) u(/i/,j)

The former means processing in serial for the bare index i and in parallel for the slashed index j (processing in the x-direction), and the latter means processing in serial for the bare index j and in parallel for the slashed index i (processing in the y-direction). Whichever expression is taken, they are the same data. A solution of the mapping problem is the following: first assign index pairs, (r,q) and (t,s), for the original indexes i and j respectively. They are put in a relation of $$i=(q-1)N+r, j=(s-1)N+t.$$

Both forms of the 2-dimensional array may be mapped to 4-dimensional arrays, (1) u(r,/q,/t//) (s)
(2) u(/r,/q//,t) (s)

where the triple r, q and t specify any one of 3-dimensional memory banks and the index s selects respective local positions in the banks. Clearly the former is for processing in the x-direction in a 3-dimensional case and the latter is for processing in the z-direction. It is here noted that in (2), the original slashed index /i/ itself is replaced by the slashed /r,/q//, which means that once j or (t,s) is specified, the data of the number $N^2$ may be accessed in parallel for i or (r,q), while in (1), the index i specifies not only the bare r but also the slashed q, which means that instead of $N^2$, only data of the number N may be accessed in parallel for t. In order to deal with data of $N^2$ for vector-parallel processing, it is necessary to also access data of number N in all banks with index (q,t). To realize it, it is better to have memory banks further divided into so many sub-banks to allow the so-called interleave way of access, or to use such fast devices as the so-called RDRAM (Rambus, Inc. USA) or Synchronous DRAM(USA JEDEC). Those data of length N with continuous s's may be transferred through x-specifying row busses and serial busses to-/from vector registers. This is just the auxiliary processing in the x-direction. Here is just the reason to supply access latches with length N. Data for such processing might be exactly written as (1) u(r,q,//t//) (/s/)

This is the expression not seen in 3-dimensional cases. Only the system software is concerned with such realization, and users have only to understand two ways of processing for u(i,/j/) and u(/i/,j). For example, to get the sum of two metrics $\{a(/i/,j), i,j=1, 12, \ldots, 256\}$ and $\{b(/i/,j), i, j=1, 2 \ldots ,256\}$, we have only to write the following program:

```
pdo i=1,256
   do 10 j=1,256
      a(/i/,j) = a (/i/,j) + b(/i/,j)
pend
```

The system software will expand it as follows:

```
pdo r,q = 1,16
   do 10 t=1,16
      do 10 s=1,16
         a(/r/q//,t) (s) = a(/r,/q//,t) (s) +
         b(/r,/q//,t) (s)
pend
```

On the other hand, for $\{a(i,/j/)\}$ and $\{b(i,/j/)\}$, the program

```
pdo j=1,256
   do 10 i=1,256
      a(i,/j/) = a (i,/j/) + b(i,/j/)
pend
``` will be expanded as

```
pdo t,s = 1,16
   do 10 r=1,16
      do 10 q=1,16
         a(r,q,//t//) (/s/)=a(r,q,//t//) (/s/) +
         b(r,q,//t//) (/s/)
pend
```

AN EXAMPLE OF IMPLEMENTATION

This section shows a compact system of using today's available vector chips. Suppose N=16. The main memory banks are placed on 16 boards. The processor part consists of 16 other boards for vector units and one board for the control unit. Those boards all are plugged in a mother board which also has the vector latch part on itself.

Every memory board has a bank array of size 16×16. Every bank consists of 16 chips of 4 Mbit (1M×4) DRAM (50 ns), 1M-64 bitW, so that every board has 4096 chips, 256 MW (2048 MB) and the whole system has 4096 MW(32GB). Every bank is attached by a access-latch of 64 bit-width and 16 word-length. One set of 16 64 bit-busses runs as rows and the other set of 16 64 bit-busses runs as columns on each board.

Every board has 1088 data-bus lines, i.e. 1024=64×16 from column busses and 64 from row busses on its edge. The 32 address-bus lines are sufficient to appear on its edge, and the remaining lines are for two control signals to determine processing direction and clock, etc.

The 32 bit address is necessary for 4096MW. The 32 bits are divided as follows: in a 3-dimensional problem, any one of coordinates is assigned 8 bits, 4 bits of which are for a physical bank address and the other 4 bits are for a logical/virtual bank address. The remaining 8 bits are for identifying variables. At most, the system allows the solution of those problems of 256 variables on a 256×256×256 grid region; in a 2-dimensional problem, 4-dimensional arrays are used. The 6 bits are supplied for 3 directions, with 4 bits being for a physical bank address and 2 bits for a virtual bank address. The remaining 14 bits are for addressing in each bank, with 6 bits for the fourth dimension and the others for identification. It means that we can solve problems with up to 256 variables on a 4096×4096 mesh region.

The vector-latch part has 16 vector-latches of 16 word length, which are connected to the main memory part and the processor part through serial busses, and also to the main memory part through parallel busses. Memory access through those vector latches is based upon the interleave way; the memory cycle time 48 ns/16W is sustained, including delay of latches and selector circuits.

The processor part has 16 vector chips of CMOS running on 100 MHz. Every chip has 16 vector registers of 256 64 bit-word length and 4 pipelines for vector processing, and has a buffer for commands, an internal control and bus unit, and scalar unit together with scalar registers. This chip is attached with an external storage for scalar data, 4096W.

The control unit also has a processor of 100 MHz and instruction memory (1 MW).

Its peak speed is about 6.4 GFLOPS, while its sustained speed in a situation of continuous operation of only 2 pipelines may be 3.2 GFLOPS, which realizes about 1.7 W/FLOP in memory throughput.

While the preferred embodiment of the present invention has been described, other modifications will be apparent to those skilled in the art without departing from the scope and principles of the claimed invention.

What is claimed is:

1. A back-end multiprocessor parallel computer system comprising:

a control unit CU for controlling and synchronizing said backend multiprocessor parallel computer system;

a plurality of identical vector processors of the number N named as VU1, VU2, ... VUN, where N is a positive integer greater than one; and a plurality of identical memory bank units arranged in a three-dimensional array of N matrices, N by N,

| MB(1,1,k), | MB(1,2,k), | ..., | MB(1,N,k) |
   |---|---|---|---|
   | MB(2,1,k), | MB(2,2,k), | ..., | MB(2,N,k) |
   | ... | ... | ... | ... |
   | ... | ... | ... | ... |
   | MB(N,1,k), | MB(N,2,k), | ..., | MB(N,N,k) | where k=1, 2, ..., N, and where any memory bank unit MB(i,j,k) placed at the cross point (node) of the ith row and the jth column busses wired on the kth conceptual board can be accessed through said ith row and jth column busses, and consists of N sub-banks, so that the system of memory bank units seem to be a 4-dimensional system of sub-banks; and allowing four routing ways for N vector processors to access in parallel:

1) a set of row vectors whose elements are shared in the rows of said memory bank units with any selected common row number 'i' over all boards, {MB(i, ... ,k), k=1, 2, ... N)} in the scheme of kth vector processor accessing kth row vector, 2) a set of vertical vectors whose elements are shared in the vertical segments of said memory bank units ranging over N boards with any assigned common column number 'j' {MB (i, j, ... ) i=1, 2, ..., N} in the scheme of ith vector processor accessing ith vertical vector, 3) a set of column vectors whose element are shared in the columns of said memory bank units on any assigned memory board of number 'k', {MB(. . . ,j,k), j=1, 2, ..., N} in the scheme of jth vector processor accessing jth column vector, and 4) a set of 'depth' vectors whose element are shared in the N sub-banks of vertical segments of said memory bank units with any assigned pair of row and column numbers (i,j) over N boards, {MB(i,j,k), k=1, 2, ... ,N} in the scheme of kth vector processor accessing kth 'depth' vector, and to process a set of vector data with a large length which is gotten by repeating memory bank unit access some times through any one of the said four routing ways in the scheme of mth vector processor processing mth long vector, where m is a positive integer less than or equal to N, and then returning the results to the said memory bank units through the selected routing way or another routing way.

2. A computer system as recited in claim 1 wherein the said four routing ways are established by supplying
   a plurality of $N^3$ identical access-latches, each having N element-latches, placed at nodes of row and column busses wired over all boards, and standing between each corresponding memory bank unit MB(i,j,k) and its connected ith row and jth column busses, and a plurality of N identical vector latches, each having N element latches and each said vector latch having a first and a second serial port with the second serial port being connected directly to the corresponding vector processor, and each vector latch having a plurality of N parallel ports, and the first routing way established by connecting the first serial port of kth vector latch to the row of access-latches with any specified row number 'i' on kth board through the row busses on all boards, and the second routing way established by connecting the access-latches of any vertical segment of the said memory bank units to the 'parallel' ports of the vector-latches through the column buses so that the access latches of the ith vertical segment with any specified column number 'j' are connected to the ith parallel port of the vector latches, and the third routing way established by connecting the first serial port of the jth vector-latch to the jth column of accesslatches on the board of any specified number 'k' through column busses, and the fourth routing way established by connecting the kth access-latch of the vertical segment of access-latches with any specified pair of row and column numbers (i,j) through row busses to the first serial port of the kth vector latch.

* * * * *